(12) United States Patent
Bartley et al.

(10) Patent No.: US 6,712,266 B2
(45) Date of Patent: Mar. 30, 2004

(54) NETWORK TRANSACTION AND CASH-ACCEPTING ADD-VALUE STATION

(75) Inventors: Melea Jean Bartley, Cortland, NY (US); Charles Anthony Martin Brock, Ithaca, NY (US)

(73) Assignee: Darrell G. Rademacher, New Port Richey, FL (US)

( * ) Notice: Subject to any disclaimer, the term of this patent is extended or adjusted under 35 U.S.C. 154(b) by 217 days.

(21) Appl. No.: 09/864,784

(22) Filed: May 25, 2001

(65) Prior Publication Data
US 2002/0175208 A1 Nov. 28, 2002

(51) Int. Cl.[7] ................................................. G06K 5/00
(52) U.S. Cl. ....................... 235/380; 235/381; 235/382; 235/449
(58) Field of Search ............................... 235/380, 449, 235/381, 382

(56) References Cited

U.S. PATENT DOCUMENTS

| | | | |
|---|---|---|---|
| 4,650,978 A | 3/1987 | Hudson et al. | 235/380 |
| 5,146,067 A | 9/1992 | Sloan et al. | 235/381 |
| 5,187,352 A | 2/1993 | Blair et al. | 235/382 |
| 5,440,108 A | 8/1995 | Tran et al. | 235/381 |
| 5,450,938 A | 9/1995 | Rademacher | 194/206 |
| 5,637,845 A | 6/1997 | Kolls | 235/381 |
| 5,679,940 A * | 10/1997 | Templeton et al. | 235/380 |
| 5,854,581 A * | 12/1998 | Mori et al. | 235/379 |
| 5,869,826 A | 2/1999 | Eleftheriou | 235/380 |
| 5,930,810 A | 7/1999 | Farros et al. | 707/506 |
| 5,955,718 A | 9/1999 | Levasseur et al. | 235/361 |
| 6,000,608 A * | 12/1999 | Dorf | 235/380 |
| 6,032,859 A * | 3/2000 | Muehlberger et al. | 235/449 |
| 6,129,275 A | 10/2000 | Urquhart et al. | 235/381 |
| 6,131,399 A * | 10/2000 | Hall | 62/127 |
| 6,152,365 A | 11/2000 | Kolls | 235/381 |
| 6,473,500 B1 * | 10/2002 | Risafi et al. | 379/144.01 |

* cited by examiner

Primary Examiner—Michael G. Lee
Assistant Examiner—Seung H. Lee
(74) Attorney, Agent, or Firm—Bernhard P. Molldrem, Jr.

(57) ABSTRACT

A networked copier and printer system permits on-line payment for use of copier or computer printer, charging against a positive balance customer account stored at a central station, and permits customers to add to their copier account. A network transaction station accepts a customer ID from a magnetic card or bar code reader, or from a keypad input. After the customer enters his or her PIN, the account balance is downloaded from the central database, and the copier or printer is enabled. An add-value station on the network allows the customer to deposit cash and add to his or her account balance, after entering a customer ID and PIN. The value added station presents a receipt that omits the customer account identification but contains a unique transaction tracking code. An off-line mode permits copying during network outages.

6 Claims, 8 Drawing Sheets

Server Printer Configuration — C:\ocsprog\cdusr\admin\queues.dat

| Monitored Printer | Port Name | Share Name | Destination Printer | Destination Port | Color/BW | Group |
|---|---|---|---|---|---|---|
| SHARPM | | \\OCSSERVER\SH... | SHARPO | IP_192.168.0.27 | Color | U |

[Add Server Printer] [Remove Printer] [Change Color/BW] [Change Group] [Control Panel Printers] [All Done]

[Change Port] [Change Type] [Select Server Queues to Vend] [Set to Default]

| Printer | Page Type | Default BW Cost | Default Color Cost | Page Type |
|---|---|---|---|---|
| SHARPM | 11x17 | 0.20 | 0.30 | 11x17 |
| SHARPM | A3 | 0.20 | 0.30 | A3 |
| SHARPM | A4 | 0.10 | 0.15 | A4 |
| SHARPM | B5ISO | 0.10 | 0.15 | B5ISO |
| SHARPM | B5JIS | 0.10 | 0.15 | B5JIS |
| SHARPM | Legal | 0.10 | 0.15 | Legal |
| SHARPM | Letter | 0.10 | 0.15 | Letter |

[Add New Cost Type]
[Update Prices]
[Remove Cost Type]
[Add Cost for All Types]

Default Prices

- Card-BW Cost ☐
- Card-Color Cost ☐
- Cash BW ☐
- Cash Color ☐
- Display Line BW ☐
- Display Line Color ☐
- Accounts BW ☐
- Accounts Color ☐
- Purse BW ☐
- Purse Color ☐
- Price Line BW ☐
- Price Line Color ☐
- Cash Card BW ☐
- Cash Card Color ☐
- Unit Card BW ☐
- Unit Card Color ☐

NETWORK TRANSACTION AND CASH-ACCEPTING ADD-VALUE STATION

BACKGROUND OF THE INVENTION

The present invention relates to devices and techniques for accounting for payment for products from a service delivery machine, such as a copier or printer, and is more specifically directed to a device for debiting a customer account that is held in a central networked computer and to a device for adding value to the customer account at a location remote from the central computer.

In an institutional environment, such as a university, public library, hospital, corporation governmental department, or similar organization, it is common for there to be numerous photocopying machines for making reprints of records, either from paper originals or from microfilm or microfiche. For many of these institutions, such as university libraries, there may be banks of computer printers where students or staff may print out drafts of reports, term papers or similar assignments. In each case, some attempt has been made to account for the copies or prints being made, and to assign the costs to the individual student or to a billing center, such as the department in the case of a faculty member. There is sometimes a procedure for a visitor to make copies or prints of documents, but most often this involves depositing coins into a coin box on the printer or copier.

Debit cards are often used in libraries for effecting payment for copies, and usually these take the form of magnetic stripe cards. In that case there is a card reader associated with each copy machine, and a station where cards can be purchased, or where additional value can be added to the card. These debit cards have a magnetic stripe on which is stored a magnetic code that represents the amount of value remaining on the card, as well as codes that permit the card to be used in the particular copiers in that library. Because the value is stored directly on the card, there is a problem for students or others that may lose or misplace the card, or if the card is stolen. The institution has no record of anyone's account balance, and so when the card is lost or stolen, the account balance is lost as well.

Also, in a traditional off-line system, all transactions are anonymous unless a separate paper record is maintained, and it is difficult to track usage by department or by individual, and this may make it difficult in planning for optimization of system uses and resources.

Also, these systems require special copy or vending cards are required, in addition to any Student Identification cards or badges that the copier or printer users may already have to carry.

OBJECTS AND SUMMARY OF THE INVENTION

Accordingly, it is an object of the present invention to provide an on-line, i.e., networked system in which users could have an account stored in a data base on a central, networked computer, and could obtain access to copiers, printers, or other service-delivery devices by entering an account identification and a customer PIN, and in which the use of copiers or printers is permitted only if there is a positive balance in the customer account, or if a credit-type account or departmental account has been established.

It is another object to provide a simple-to-use arrangement for the customer to add value to his or her account so that the account balance is high enough to permit purchase of copying or printing.

It is a further object to provide apparatus that permits the user to replenish his or her account by a simple process of entering a user identity and PIN number (or account password), and, and then by inserting currency, e.g., $5, $10, $20, or $50 bills.

It is a still further object to provide avoid problems inherent with off-line debit card systems, e.g., difficulty in tracking departmental usage of copiers and restoring account balances to users who may have experienced a loss or theft of their card.

It is a yet further object to provide a copying and printing networked system with accounting capability.

In accordance with an aspect of this invention, the system is provided with a network transaction station for controlling a copier, a printer, a fax machine, or another automated service providing machine so that the latter dispenses a product (e.g., copies, printed paper, or a fax connection) and correspondingly effects transfer of payment for this from a customer account to a copier or printer account. In this case, the customer accounts and the accounts for storing the monies earned by the machines are stored in a central computer that is coupled to a network. In a straightforward example, the network can be an Ethernet. The network transaction station has a housing, and contains a magnetic card swipe reader, and/or a bar code reader, or may simply use a keypad for accepting a customer input of the customer's account identification. A keypad is provided to permit customer input of the PIN number associated with the customer account. As is usual, the PIN is a customer-selected number and is used for customer security. There are a number of outlet ports or couplers on the housing, including a device coupler for connecting to the controller device of the associated service providing machine, e.g. copier, and a network coupler for connecting to the Ethernet or other network to communicate with and access the central computer. Inside the housing is a controller circuit that is connected to the card swipe, bar code scanner or other means of accepting the customer identification, the keypad, the device coupler and the network coupler. The controller circuit provides means to track the balance on said customer account in said central computer; by communication with the copier or other machine determines the price of a product selected by the customer; and then authorizes the transaction, permitting the machine to provide the requested product when the customer balance is greater than the price of the selected product. The delivery of this product would be denied if the account balance is too low. The controller then signals the central computer to debit the associated customer account by an amount corresponding to the price of the selected product. This may be a fixed amount per copy, or may be a variable amount depending on system parameters.

A display located on the housing, which may be an LCD or may be a vacuum fluorescent display, for example, provides instructions for the customer, and also displays the customer balance during the transaction. The display may also show the customer name or account identification number, or other information useful to the customer.

In a preferred embodiment, there are add-value stations or add-value machines situated at convenient location, and also connected to the central computer over the network, to permit customers to add to the dollar balance of their accounts. The add-value station is situated in a secure locking cabinet, which may be securely anchored to a wall, to a counter, to a pedestal secured to the floor, or directly to the floor. On the face of the station cabinet is a magnetic card reader and/or a bar code reader, which may serve as means for accepting a customer input of the customer's account identification. A keypad is provided on the front of the cabinet for customer input of the PIN number associated with the customer's account. The keypad also may have functionality for accepting the customer's account number. A currency acceptor, which may be bill acceptor capable of accepting up to a $20 bill, is situated within the cabinet, and has a portion that protrudes through the cabinet for receiving money from the customer. In some embodiments, a coin acceptor may also be included. While a change-making capability is not contemplated for the preferred embodiment, that may be desired in some instances, and could also be included. However, because the customer account is stored centrally in a computer, and for example may be accessible by authorized persons at the University Bursar's Office, or at the institutions's finance or comptroller's department, it is possible to obtain refunds, make account adjustments, or recover the value associated with a lost identity card, by human intervention at such locations.

There is also a data port, i.e., a network coupler for connecting to the Ethernet or other network to access the central computer, and a controller circuit within said cabinet. The controller circuit is connected with the magnetic card reader, bar code reader or other means for accepting the customer account identity, and to the keypad, the network coupler, and the money-accepting device(s). The controller circuit serves to track the balance of the customer account in said central computer; determines how much money has been deposited by said customer into the money-accepting device(s); and then authorizes the central computer to increase the balance of the customer account by an amount corresponding to the amount of money deposited by said customer in the money-accepting device. Usually this would be a dollar for dollar amount, but it is possible to provide the customer with bonus amounts for larger deposits, for example, permitting $21 worth of copying for a $20 deposit.

Of course, the bill-acceptor may have an escrow feature, with the capability of returning the currency to the customer in the case that there is a network communications failure prior to completion of the deposit transaction.

The network transaction stations of this invention provide secure access to unattended copiers and printers at the host facility, and eliminate the problems associated with proprietary debit cards by using instead an on-line accounts-based system. This permits automatic tracking of activity on all printers and copiers in the system in a single database.

The network transaction station, or NTS, simply prompts the user to swipe a card, position a bar-coded badge, or enter a customer identification name or number on the key pad. Then the NTS prompts the customer to enter the customer's PIN number. If the central database verifies the PIN, the account balance is downloaded, and the copier is enabled as long as there is a positive account balance. The customer account balance is shown on the display. The NTS provides a multiple event tracking capability, with two price lines in a standard mode, or a greater number in a steering mode permitting customer selection of various printing or copying options). The NTS can be programmed for matching any of a wide variety of copiers.

For print jobs, privacy is ensured at network printers if the NTS interface is used. For example, a user can set up a print job from a personal computer, either on site or at a remote location, and can direct the print job, through software, to a specified printer location. Then, at the print location, the user simply swipes his or her card, or scans his or her bar code, or enters his or her customer name or ID by keypad, followed by entry of the PIN. Once the account is authenticated, the NTS displays a list of the user's print jobs that are waiting on the print queue. The customer then selects the print job, and it is sent to one of the printers at that location. No one other than the user can gain access to the customer's documents. In a preferred method, the user creates the document on a computer and then can select the item or items to print, that is the specific pages, color or black-and-white, paper size, single-side or duplex, and other options. Then the customer can access his or her account via the account identification and PIN, and check the account balance. The job may be sent directly to a printer, or alternatively the user can enter a print job name and sent the document or documents to a central print queue. The job sent to that queue is listed and accessed on a central print release station. At that place, the user can select his or her job from the queue, and is again shown the costs to print. The user is instructed to pay for the print job. The user can enter his or her name or account, and PIN, or swipe his or her card, or present a bar-coded badge or card at the NTS, and then enter the PIN.

The add-value station also plugs into a standard Ethernet hub or switch to communicate with the central accounts database. The self-service device lets users add money to their accounts, or even to create new accounts at any time. The users can access their accounts through the keypad, card reader, or bar code scanner, and then add funds via a standard bill acceptor. In a preferred arrangement, the card reader accepts any standard ABA magnetic stripe card, which may be a credit card, identity card, or even a grocery card already in the user's possession. To create a new account, the user inserts or scans the card, or can simply key in a desired account number, and follows screen prompts to create a secure PIN using the keypad, and then inserts cash.

Each of the NTS and the Add Value Station may incorporate a fast thermal receipt printer that provides the user with a receipt for the value of the purchase transaction or the deposit transaction. The receipt may not include any user identity or account number, but does include a unique transaction code that can be used for tracking purposes.

The Add Value Station cabinet is a heavy duty steel enclosure, using a T-handle screw lock and with a door swinging on a full-length piano hinge. The keypad is vandal-proof. This construction is ideal for unattended use. The Add Value Station provides at least three avenues of access, keypad, card swipe, and bar code scanner, with the keypad also being used for responses to prompts and entering PIN numbers. The unique transaction identifier on the receipt provides proof of deposit and guarantees security of funds. Also, the amount of money being held in a given add value station is known at the central data base location, and an attendant can be sent if necessary to pick up the bills stored in the bill acceptor.

In the case of libraries, it is also possible to use the NTS for payment of library overdue fines using monies paid from the patron's copier and printer account. For colleges and universities, it is possible to integrate the student customer's account with existing services such as a meal services program. The ability of the copier and printer account to work synchronously with other databases would permits a multiple-purse operation without having to rely on any account balance data being carried on the student user card.

A smart-car reader could be incorporated, to use a smart card or chip card for access to the NTS.

The system of this invention also permits off-line back up in the event of network failure. It is possible to provide full audit information for a many as several thousand account holders at each NTS location so that photocopying may be enabled following a network failure. Once the network is restored after a failure, the account and transaction information will be automatically uploaded to the central database. To prevent a user bringing down the network connection in order to obtain free copying, each NTS location is designed to require a special program card or access code to put the NTS into the back-up mode. Only a trusted attendant would have access to the special program card or the special access code.

For college or university staff or faculty, some total budgeted amount for each department is loaded into the database on a monthly basis, and the staff and faculty use the NTS to debit against the departmental copier and printer account, or charge as a credit account if the faculty has established a departmental credit account. This provides a means for accounting and tracking copier and printer usage from department to department using the same database as used for student accounts and guest accounts. Departmental usage records can be accessed at any time, and without having to obtain manual input from meters at the copiers.

With this system, current student ID cards, bearing either a standard ABA encoded magnetic stripe or a bar code symbol, and also be used for the student debit account for printing and copying. A supply of blank cards can be used for guests and visitors who may want to establish an temporary account for copier use. A self-service procedure is used for establishing new accounts and for adding money to existing accounts. Staff and faculty have their copier use billed against their department accounts. Card use is protected from theft by the requirement for secret PIN numbers. Copying and printing are billed to a single database. The data base is two-way updated in real time.

A real benefit over existing off-line debit card systems is that lost cards do not mean lost account value. With this system, the student card or other user card does not hold the account value. Lost cards can be replaced, and the value existing on the prior account can be transferred to the new account at the bursar's office. There are similar advantages to use the NTS and Add Value Stations within any corporation, municipality, state or federal department, library, hospital, copy or printing shop, or other organization.

The above and many other objects, features, and advantages of this invention will become apparent from the ensuing description of a preferred embodiment, which should be considered in connection with the accompanying Drawing.

DETAILED DESCRIPTION OF THE PREFERRED EMBODIMENT

Figure 1:
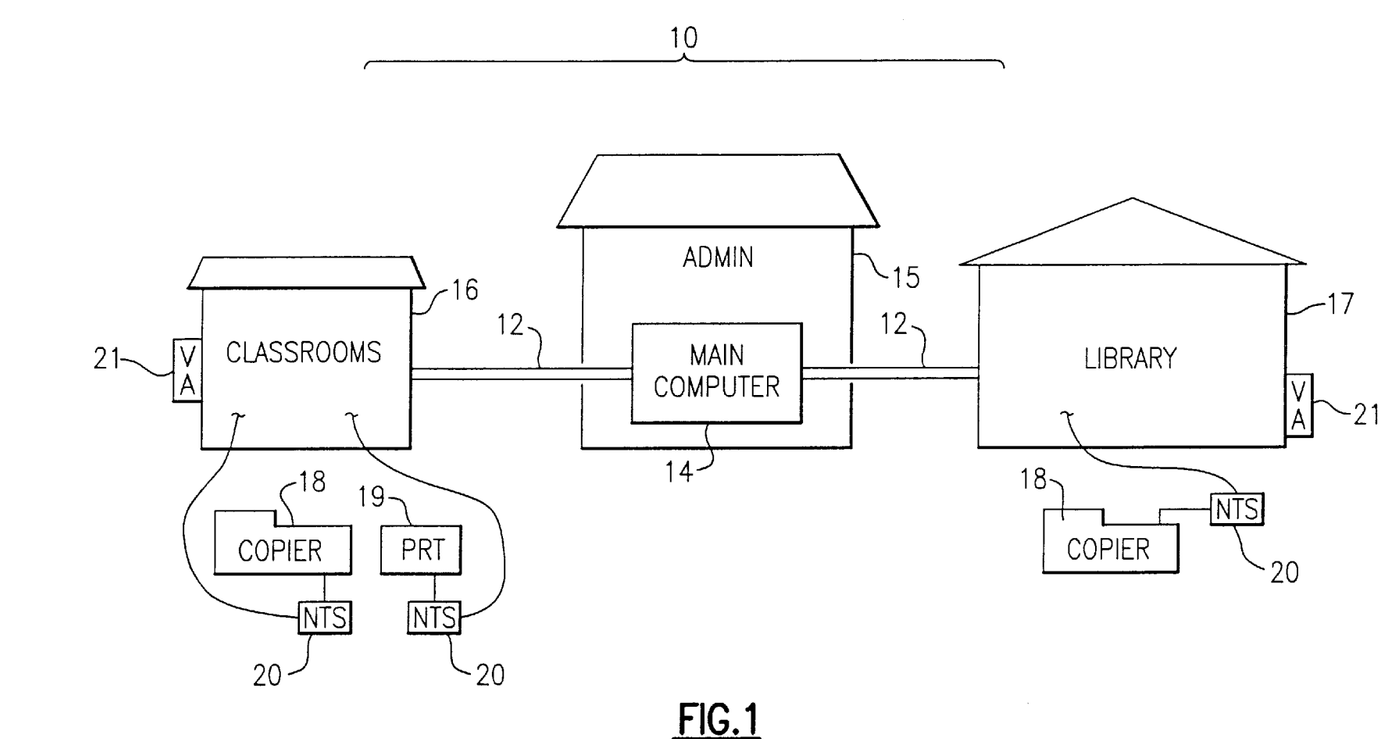
FIG. 1 is a schematic view of a printing and copying system of this invention in a college or other scholastic environment.

With reference now to the Drawing, FIG. 1 shows very simply an on-line cash-based copier and printer control and accounting system 10. In this system a network 12 links a main computer 14, here located in a college administration building 15, with equipment in other campus buildings, e.g., a classroom building 16 and a library 17. In each of these locations, there may be one or more copier machines 18, and there can be one or more computer printers 19. A network transaction station, or NTS 20 is associated with each of the copiers and printers, and each station 20 has a connection to the network 12 and another connection going to a controller board within the associated copier 18 or printer 19. Each NTS 20 allows a user to purchase copying or printing service from the associated copier or printer and pay for this out of his or her account that is stored on the central computer 14. In each location here, i.e., in each of the library 17 and classroom building 16 there is also an add-value station 21, and these stations 21 permit the customer or user to add value to his or her account by depositing money into the add-value station. The database at the main computer 14 has a capability of real-time tracking of copier and printer usage, an is the location of the customers' copying and printing accounts as well. A human interface at the main computer location permits the user to obtain a record of his or her copier usage, if desired, and can rescue the account value in the case of a lost or stolen access card.

Figure 2:
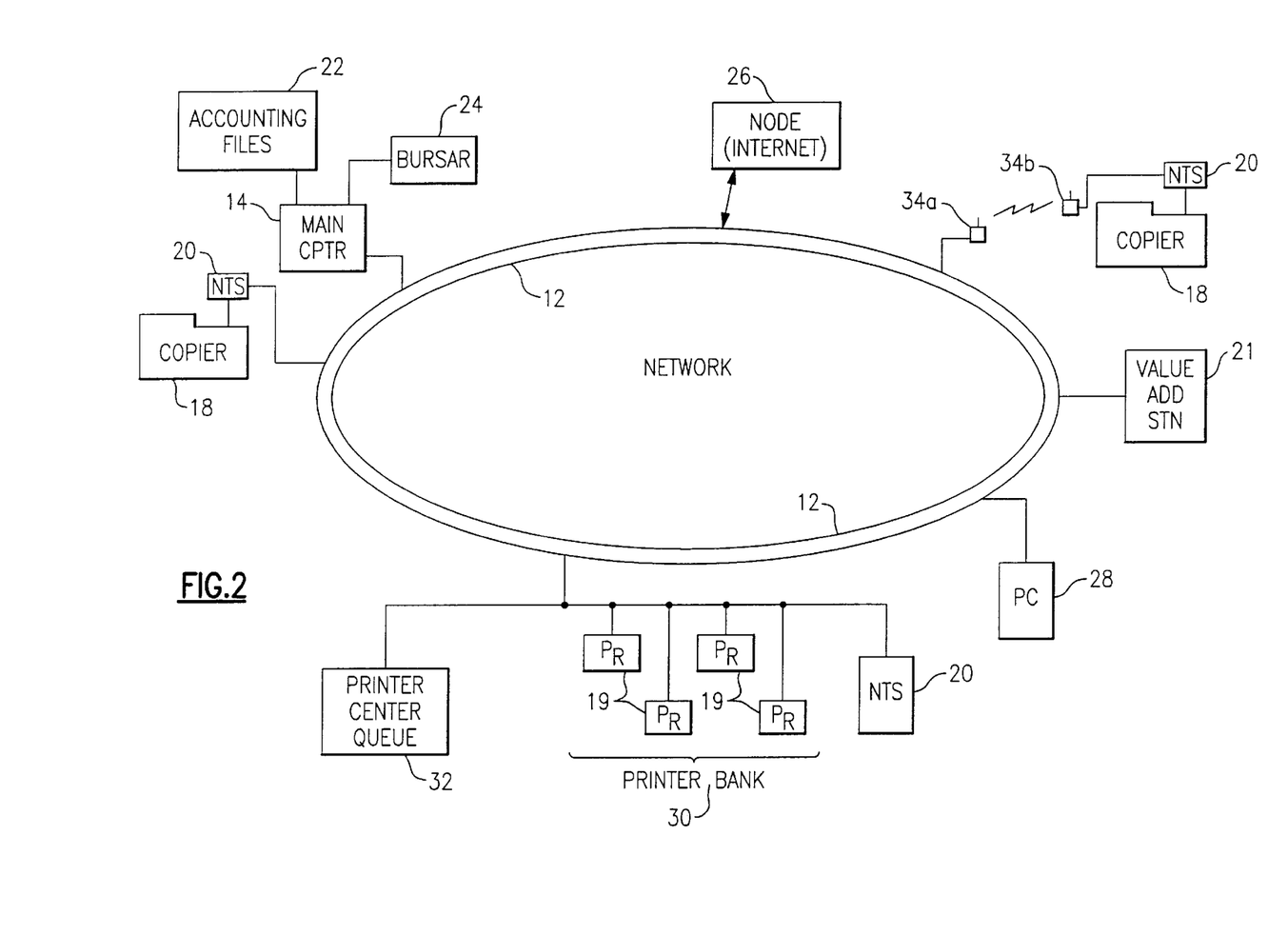
FIG. 2 is a more detailed schematic view of the printing and copying system according to an embodiment of the invention.

A more expanded view of the system is shown in FIG. 2, with the Ethernet 12 (or other network) connecting the main computer 14, here shown with a database 22 containing the customer account files and an interface for access by the bursar or other financial officer. The Ethernet 12 also connects with the various network transaction stations 20 and value stations 21, as well as providing a node 26 for Internet access, and hosting one or more personal computers, i.e., workstations 28. The computer workstations 28 here may be used to generate or edit documents, and then send its documents as print jobs, via the Ethernet 12, to a printer bank 30, which has an associated NTS 20. Here as schematically shown, the print jobs are stored in a printer center queue 32, and are released to one of several printers 19 in the printer bank 30 when the user accesses the same via the associated network transaction station 20. It is possible to employ wireless connections (e.g., infrared or low power radio) between these elements and the network 12, and here a pair of data transceivers 34a and 34b are shown, with one of these 34a wired to the Ethernet 12 and the other 34b wired to the NTS 20 associated with a copier 18. These can be used anywhere in the system, and permit the copiers or other service dispensing machines to be located at some distance from an Ethernet port, typically, up to 500 feet.

Figure 3:
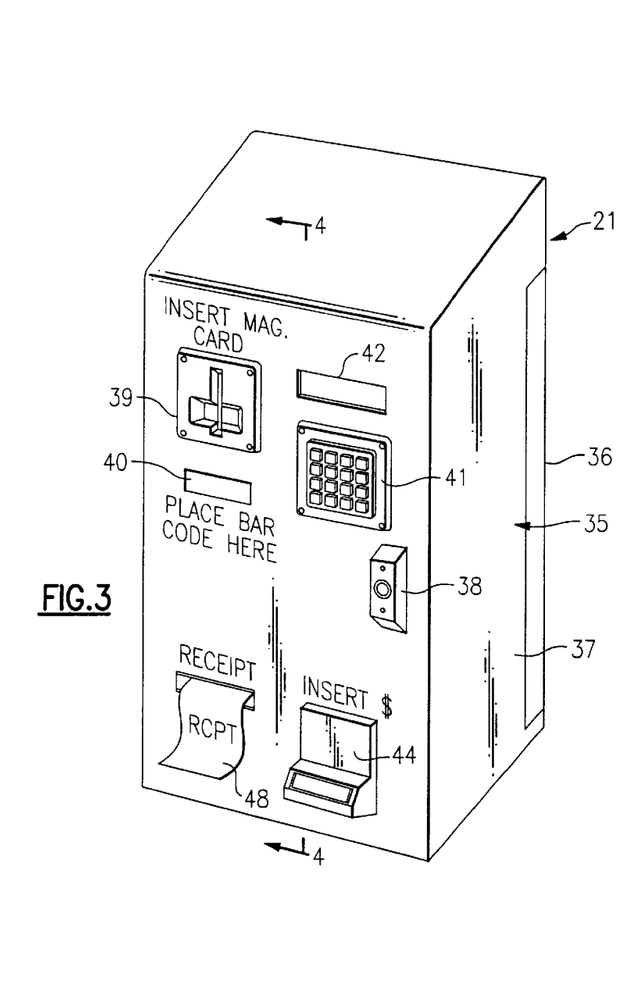
FIG. 3 is an add-value station according to one embodiment of this invention.
Figure 4:
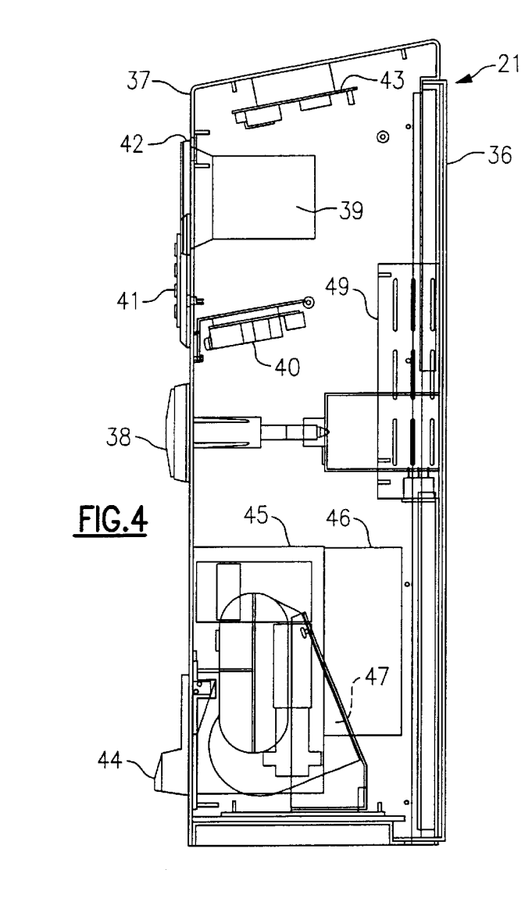
FIG. 4 is a sectional elevation of the add-value station of FIG. 3.

An add-value station 21 according to an embodiment of this invention is shown in FIGS. 3 and 4. The add-value station 21 can be mounted securely on a wall, or can be positioned on a counter or on a pedestal, and is situated in a public area that will be available to customers wanting to increase the balance of their copier accounts. The station 21 has a heavy-duty steel cabinet 35 with a back 36 that can be secured to a wall or vertical beam, and a front 37 that is hinged to the back by a piano hinge (obscured in this view). The cabinet 35 may be secured to a countertop or to a pedestal. A T-handle screw-in lock 38 is used for accessing the inside of the cabinet. The T-handle locks 38 can be either commonly-keyed or differently-keyed for all the various add value stations 21 throughout the system.

A card reader 39 on the front of the cabinet allows a user to insert a standard ABA magnetic stripe card, for the purpose of identifying the customer, i.e., entering a code that represents the customer's centrally stored copy account. In this embodiment there is also a bar code reader 40 positioned on the front of the cabinet so that a user can present a bar-coded identity card or badge. Preferably, this reader 40 is a non-laser reader or scanner. A keypad 41, preferably of a tamper-proof design, is situated on the front of the cabinet to permit the user to key in a PIN or password, and to follow prompts presented on a display 42 also situated in the front of the cabinet. The keyboard in this embodiment is numerical, but in other embodiments could be alphanumeric. There are additional keys for selecting modes and for answering prompts on the screen of the display 42. The keypad can also be used by the customer or user to enter the account number, rather than placing a card in the card reader 39 or placing a badge against the bar code reader 40. After entering the identity information one of these ways, the display instructs the user to enter his or her password or PIN. The latter is a secret number, known to the user and to the host computer 14, and will not show on the display.

A controller circuit board 43 (FIG. 4) is mounted inside the cabinet in one panel of the front 37 of the cabinet 35. This is connected with the keypad, card reader, bar code scanner, and other equipment inside the add-value station. The board 43 is network-enabled and connects to the Ethernet 12 or other network.

Below the keypad there is a bill acceptor or currency acceptor 44, here capable of accepting $1, $5, $10, and $20 bills. A portion of the currency acceptor 44 protrudes through an opening in the cabinet to permit customers to insert their money. Behind this, within the cabinet 35 (FIG. 4) are a bill validator 45 and a bill stacker 46 in which the money deposited by customers is stored.

A receipt printer 47 (positioned behind the currency acceptor in FIG. 4) provides the customer with a printed receipt 48 at the end of any deposit transaction. The receipt will show the amount deposited, the customer's new balance, the date and/or time, and a unique transaction code. The latter is used instead of the customer's identity or account number for security reasons. However, the unique transaction code is stored also in the host computer 14, and can be used later for tracking purposes, if there is a question about a customer deposit.

A power supply 49 is mounted on the back 36 of the cabinet 35 and provides electric power to the various elements in the cabinet. There is also a wiring harness connecting the controller circuit board 43 with the card reader 39, the bar code reader 40, the keypad 41, the display 42, the currency acceptor 44, the receipt printer 47 and the power supply 49. The wiring a harness is omitted from the drawing to avoid drawing clutter. There is also a connector interface or port for connecting to the Ethernet 12.

In some other possible embodiments, a coin acceptor can be present, and it is also possible to provide change-making capability. It is also possible to provide an escrow capability in the money acceptor.

In this embodiment, a user can access his or her account by inserting a card into the card reader 39, presenting a bar-coded symbol on a badge or card to the bar code reader 40 or entering customer account identity data on the keypad 41. In other embodiments, a special (e.g., biometric) reader could be used to read a customer's thumbprint, or scan the customer's eye, i.e., and iris scan or retinal scan.

The system can be set up so as to recognize and accept most types of ABA magnetic strip card, such as student ID cards, credit cards, or even grocery store cards. It is possible for a guest or other person to establish a new account by inserting or scanning a card (or pushing a sequence of keys on the keypad), and following display screen prompts to create a secure PIN using the keypad, and then inserting cash into the currency acceptor. If the system is set up to recognize only specially coded cards, i.e., student or faculty University ID cards, then a supply of "guest cards" can be kept in a separate dispenser (not shown) near the add-value station.

Figure 5:
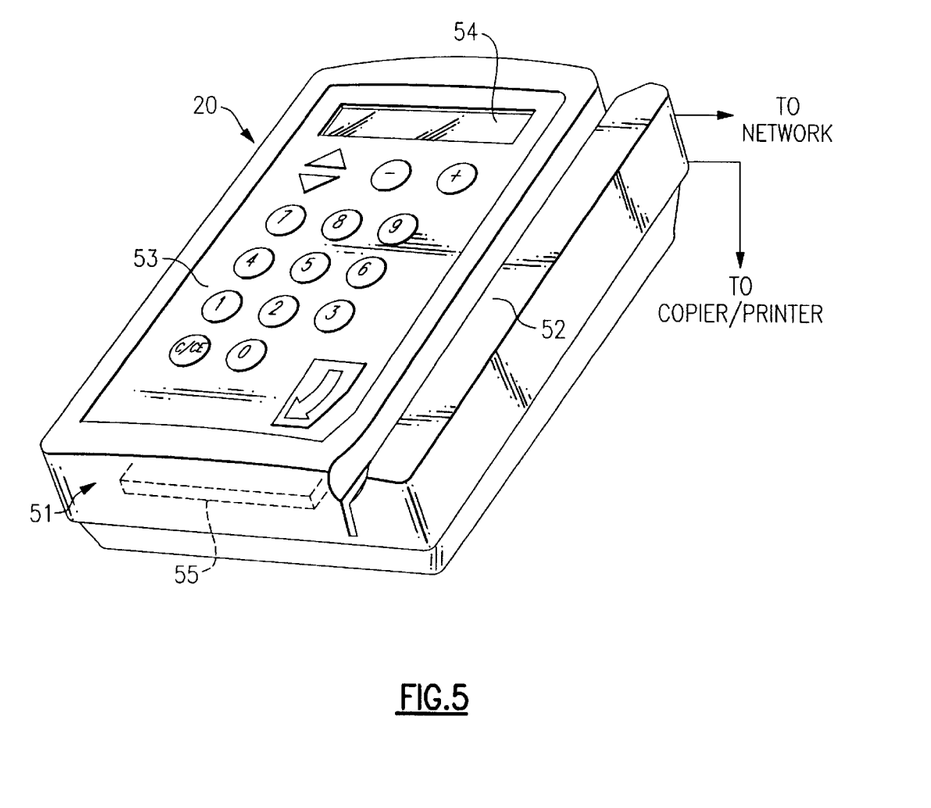
FIG. 5 is a perspective view of a network transaction station according to an embodiment of this invention.

The network transaction station 20 or NTS according to one embodiment is shown in FIG. 5, with a housing or case 51 on one edge of which is a card swipe slot 52 for reading ABA magnetic stripe cards. A numeric keypad 53 has number keys and other keys for selecting from various options presented on a display 54. Here, the display 54 is a 2-line, 20-character vacuum fluorescent display, although many other types of displays or screens could be used. Shown in ghost is a controller circuit board 55 situated within the case 51 and beneath the keypad. This is connected with the reader 52, keypad 53, and display 54, and also to outlet ports for connecting with the Ethernet network and with the controller board of an associated copier, printer, fax machine, or the like.

Figure 6:
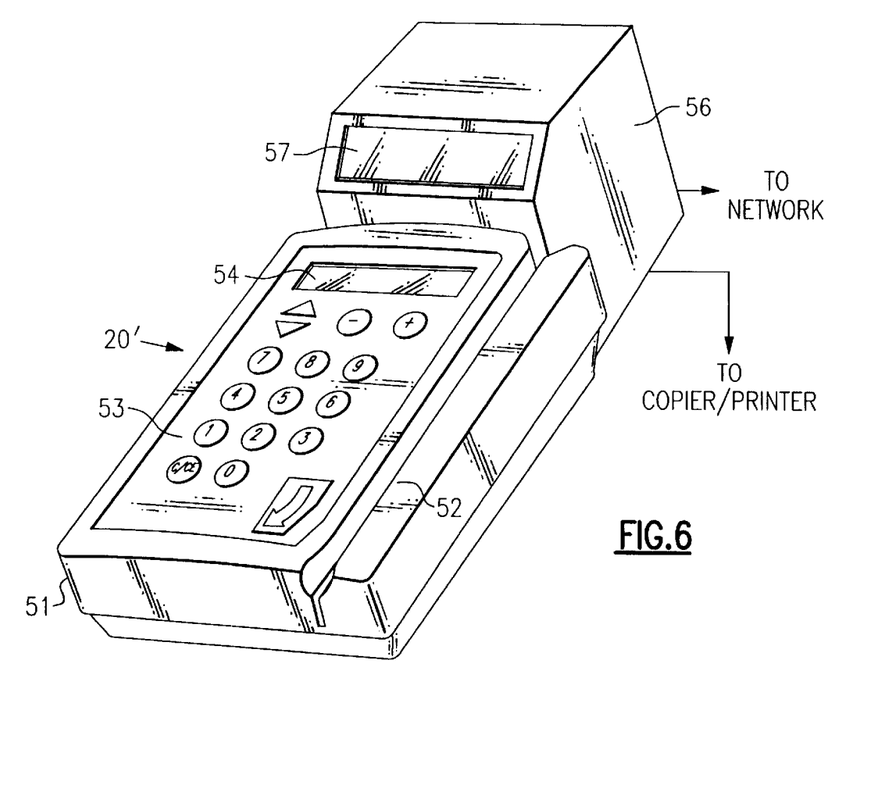
FIG. 6 is a perspective view of a network transaction station according to another embodiment of the invention.
Figure 7:
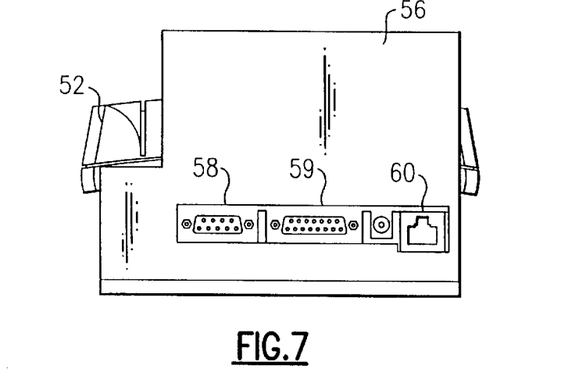
FIG. 7 is a rear view of the network transaction station of FIG. 7.

A network transaction station 20' according to another embodiment is shown in FIGS. 6 and 7, in which the same features as shown in FIG. 5 are identified with the same reference numbers, and for which the description would be the same as given just above. In this embodiment, a bar-code scanning card reader 56 is located in an extension 57 of the housing or case 51, and permits the user to initiate a transaction by scanning a bar-code card rather than swiping a magnetic stripe card. On the rear of the case, i.e., on the case extension 57 (FIG. 7) there are multi-pin connectors 58, 59 which can be used for connecting to the associated copier or printer, and a standard connector 60 for connection with the Ethernet or other network 12, e.g., 10 base-T Ethernet connection. Preferably, power to operate the NTS 20 or 20' can be taken from the host printer or copier by way of a pin of one or the other connectors 58 or 59. While the keypads shown here are limited to numerals, it is possible instead to have alphanumeric keypads. While not shown in these embodiments, it is possible also for the NTS to incorporate a receipt printer capability, and provide the user with a receipt at the end of a transaction.

For copier use, the NTS first prompts the user to swipe his or her card, scan a bar-code symbol, or type in an account or identification. Then the user is directed to enter a PIN or password before making copies. When the central or host computer 14 verifies the PIN, the account balance is downloaded and displayed on the display 54, and if the balance is higher than a minimum level, the copier is enabled. Once the transaction is completed, the activity is recorded in the central database, and the copier is disabled. The NTS is capable of multiple-event tracking with two price lines (in standard mode) and a larger number (in steering mode).

For printer use, the NTS can secure unattended printers. The NTS guarantees privacy at network printers. Customers can set up their print jobs from the network work stations 28, or from outside the network, and direct the print jobs to a specified printer location (e.g., "Law Library"). At the printer location, the customer identifies himself or herself via the NTS card swipe or bar code scan, or keypad. When the account is authenticated, the NTS displays a list of that customer's jobs from the print queue. No one else can gain access to the print jobs for this customer.

Another feature of the NTS is an off-line capability, which is used in cases of network outages. That is, the NTS is capable of providing off-line back-up in the event of network failure. A memory chip in the controller circuit board 55 can store and provide complete audit information for a large number of account holders, e.g., up to 3000 account holders, at each NTS location, so that photocopying can be enabled following a network failure. Immediately following such a network failure, an attendant or trusted person would initiate back-up mode by swiping through a special back-up program card or by entering a special access code on the keypad. Then, after the network is restored, the account information stored at the NTS locations is automatically uploaded to the central data base. The requirement for a special access code or special program card precludes a customer from crashing the network connection simply to obtain free copying.

Figure 8:
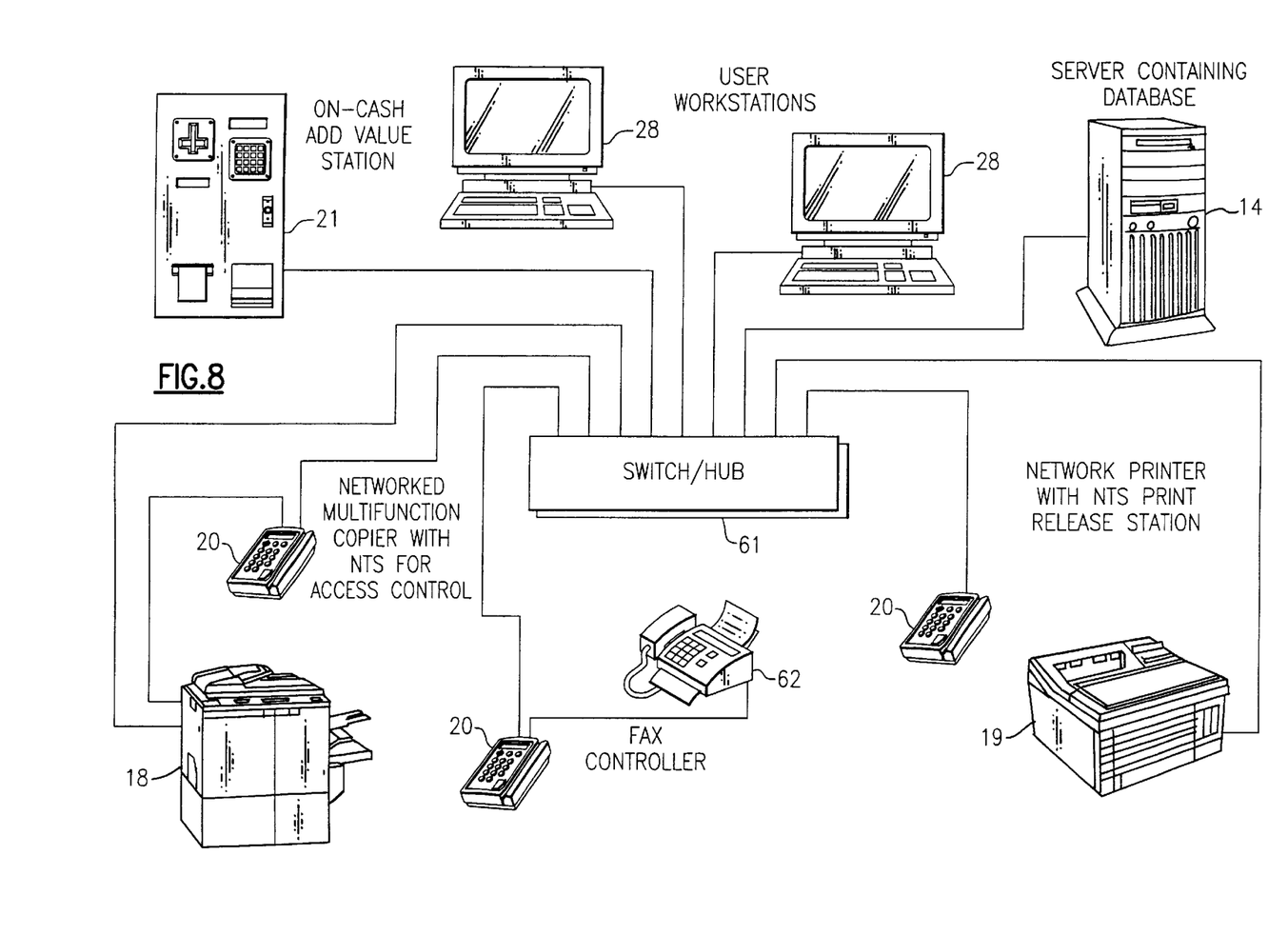
FIG. 8 is schematic of a small Ethernet based network employing NTS and add-value stations of embodiments of this invention.

FIG. 8 shows a typical small Ethernet based network using network transaction stations 20 and value added stations 21. At the center is the network switch or hub 61, and its associated server computer 14, which contains the accounts database, a set of computer workstations 28, and various output service machines, including a network printer 19 and its associated NTS 20 release station, and a networked multifunction copier 18' with its associated NTS 20 for access control. This network system also includes a fax machine 62, with an associated network transaction station 20 serving as a fax controller. The network transaction stations 20 and the add-value station 21 provide an efficient means for accounting, paying, and accessing the network resources. This could be ideal for a shared office suite, a copy and printing center or shop, or other business, governmental, or educational organization.

The network transaction stations can be used for accessing and controlling other equipment and devices besides what is shown here, for example, to control and purchase Internet access from a computer or work station, for purchasing long distance phone service at a telephone, or for purchasing food or beverage items from a vending machine.

At the administrative center where the central computer or server 14 is located, i.e., bursar's office, comptroller's office, or finance office, it is possible to obtain customer account information for any of the copier accounts and also to obtain a record of usage of any of the devices that are controlled by the NTS units 20. In addition, any changes to pricing of the various copier options or print options can be effected at the administrative center.

Figure 9:
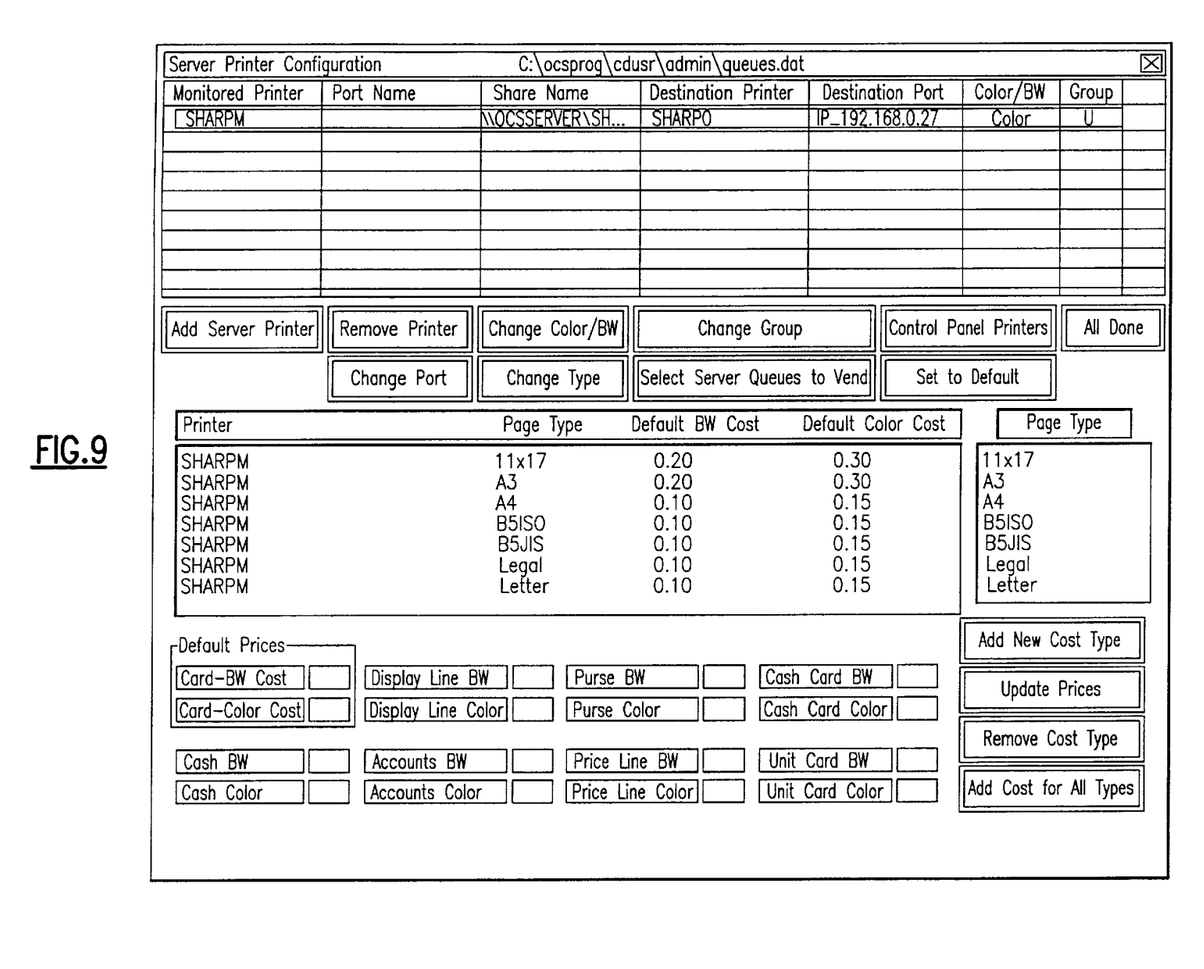
FIGS. 9 and 10 are typical account management screens for explaining the operation of the system of FIG. 8.

FIG. 9 is illustrative of a typical administrative screen, as displayed on a computer monitor, in which the activity and price options can be monitored and controlled. Here one of the various copiers on the network has been selected, and the price per copy can be selected or changed for any of a wide variety of print options, i.e., various paper sizes in both color and black and white. At this screen, it is also possible to take a given copier out of service.

Figure 10:
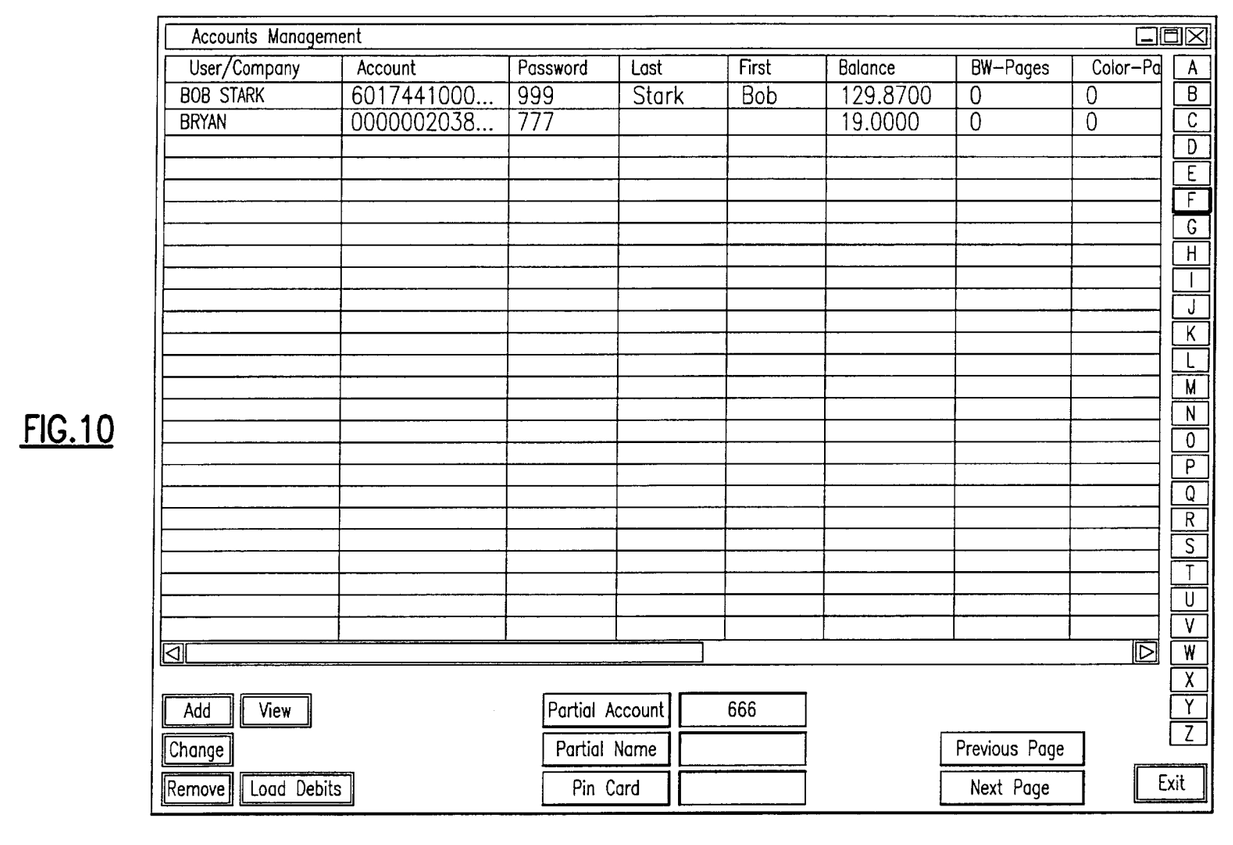

FIG. 10 shows an accounts management screen, as displayed on a computer monitor at the administrative center. In this example, the account information for two user accounts has been selected, displaying for each account the user name or identification, account number, password (PIN), and current account balance. Certain persons may be authorized to make changes in these, i.e., for purposes of transferring funds from a user account to another account for the same user in the case of a lost card. It is also possible to establish a new account at the administrative center, or to deposit money to add value to an existing account, if it is desired to do so via a human interface.

Many other functionalities are available as well for developing accounting records, equipment use records, and real-time tracking of the cash on-hand or deposit levels in each of the add-value stations. Because the amount of money stored in each add-value station 21 is available in the server computer, it is possible to have an agent collect the money from any particular station when it becomes full, so as to reduce the temptation for vandalism or theft.

While the invention has been described here in terms of a few selected preferred embodiments, the invention is not limited to those embodiments. Rather many variations would be apparent to those skilled in the art without departure from the scope and spirit of this invention, as defined in the appended claims.

We claim:

1. A method of remote cash vending employing a central computer on which customer accounts are established and stored, a network transaction station that is associated with an automated service providing machine that dispenses a product therefrom, said network transaction station correspondingly transferring payment for such product from a customer account stored in said central computer; a cash add-value station for adding value to the balance of the associated customer account based on cash deposited into said add-value station and automatically accepted therein; and a network having nodes coupled respectively to said central computer, said network transaction station, and said add-value station; the method comprising opening a customer account by using a standard pre-coded card as a customer identification, including presenting said card to a reader device in said add-value station, whereby a pre-coded number on said card becomes the associated customer account number; and accepting a customer selected PIN;

accepting one or more cash deposits from said customer into a money-accepting device in said add-value station;

transferring to said central computer the customer identification pre-coded number and PIN, and an associated value corresponding to the amount of cash deposit;

establishing a customer balance at said central computer; and thereafter accepting said pre-coded number and said PIN in said network transaction station to permit the customer to purchase product from said automated service providing machine up to the amount of the associated customer account balance as stored on said central computer.

2. The method of remote cash vending of claim 1, further comprising storing in memory means within said network transaction station input of the customer's account information, off-line authorizing, in the event of a network failure, the associated automated service providing machine to dispense said product to the customer and record the amount of purchase for a plurality of customer purchases; and [means for] automatically uploading customer account and product purchase information for all such off-line transactions to the central computer after the network has been restored.

3. The method of remote cash vending of claim 2, wherein said off-line authorizing includes enabling by a manual entry of an access code to initiate said off-line authorizing.

4. The method of remote cash vending of claim 2, wherein said off-line authorizing includes enabling by a manual entry of an access code that is treated as a manual entry keypad entry switch to initiate said off-line authorizing, in the event of a central computer hardware failure, and thereafter entering the same or another access code that is treated as a manual entry keypad entry switch after said computer hardware is restored, and thereby transferring any stored-off-line customer account and product purchase information to the central computer.

5. The method of remote cash vending of claim 2, wherein said off-line authorizing includes inserting into a card reader at said network transaction station a back-up program card containing an off-line authorizing code, and which is readable by said card reader.

6. The method of claim 1, wherein said pre-coded card is a card that bears a standard ABA encoded magnetic stripe or bar code symbol.

* * * * *